United States Patent

[11] 3,575,509

[72] Inventor Shigeru Suzuki
 Kanagawa-ken, Japan
[21] Appl. No. 806,844
[22] Filed Mar. 13, 1969
[45] Patented Apr. 20, 1971
[73] Assignee Kabushiki Kaisha Ricoh
 Tokyo, Japan
[32] Priority Mar. 19, 1968
[33] Japan
[31] 43/18143

[54] SLIT EXPOSURE DEVICE
 1 Claim, 4 Drawing Figs.
[52] U.S. Cl. .................................................. 355/66,
 355/8
[51] Int. Cl. ..................................................... G03b 27/70
[50] Field of Search .......................................... 355/8, 18,
 66, 65, 60, 64

[56] References Cited
UNITED STATES PATENTS
3,330,181 7/1967 Jakobsen.................... 355/66
3,508,825 4/1970 Hyosaka..................... 355/65

Primary Examiner—Samuel S. Matthews
Assistant Examiner—D. J. Clement
Attorney—Burgess, Ryan and Hicks ABSTRACT: A slit exposure device comprising an original document holder and an exposure slit both of which are held stationary and a movable optical system for directing light from the original document through the exposure slit to a photosensitive recording surface which is moved in a plane parallel to the plane of the document holder. The optical system comprises a fixed reflecting mirror adjacent the exposure slit over which the photosensitive recording surface is moved in synchronism with a scanning mirror. Cross-shaped mirrors and a unitary lens-mirror move in synchronism with the scanning mirror but at a speed one-half that of the scanning mirror, the unitary lens-mirror moving both perpendicular to and in the same direction as that of the scanning mirror and cross-shaped mirrors.

INVENTOR
SHIGERU SUZUKI
BY Burgess, Ryan + Hicks
ATTORNEYS

SLIT EXPOSURE DEVICE

BACKGROUND OF THE INVENTION

The present invention relates to a slit exposure device especially suited for use in a photocopying machine or the like.

The prior art slit exposure device is such that between an original and a light sensitized sheet material (referred to as "photocopying paper" hereinafter) is displaced a slit exposure device. In a photocopying machine or the like of the type employing such slit exposure device as described above, must be provided means for transporting a photocopying paper to its exposure position and holding it stationarily during exposure as planar as possible and a photocopying supporting stand having a large surface area sufficient to cover the exposure area. Therefore, such means as described above and their associated mechanism are large in size, complicated in construction and tedious in operation. These defects present the problems in providing a photocopying machine or the like compact in size and efficient in high-speed operation.

The primary object of the present invention is therefore to provide a slit exposure device which enables to focus the image of an original upon a moving photocopying paper for exposure.

SUMMARY OF THE INVENTION

In brief, according to the present invention, an original holder and an exposure slit in contact with a photocopying paper are held in stationary position. The photocopying paper is advanced in contact with and across the slit while the optical system for directing the lights from the original toward to the moving photocopying paper. The optical system is comprising a photocopying lens having a reflecting mirror disposed integrally at the rear surface of the lens, a cross-shaped reflecting mirror, a movable and stationary reflecting mirrors. The lights from the original are reflected by the movable mirror and one reflecting surface of the cross-shaped reflecting mirror and impinged upon the lens. The lights emanating from this lens are reflected by the other reflecting surface of the cross-shaped reflecting mirror and the stationary mirror and directed toward the slit.

The lens, the cross-shaped reflecting mirror and the movable reflecting mirror are displaced in such a manner that the optical length between the lens and the original and the optical length between the lens and the slit can be maintained always equal. In this case, it is very important that the movable reflecting mirror is moved in parallel with the original at the same speed that of the movement of the photocopying paper.

The above and other objects, features and advantages of the present invention will become more apparent from the following description taken in conjunction with the accompanying drawings.

DESCRIPTION OF THE PREFERRED EMBODIMENT

Figure 1:
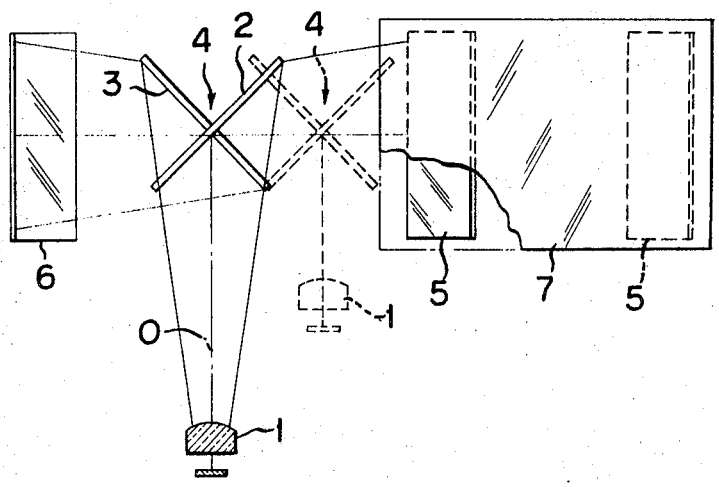
FIG. 1 is a plan view of one embodiment of a slit exposure device according to the present invention.
Figure 2:
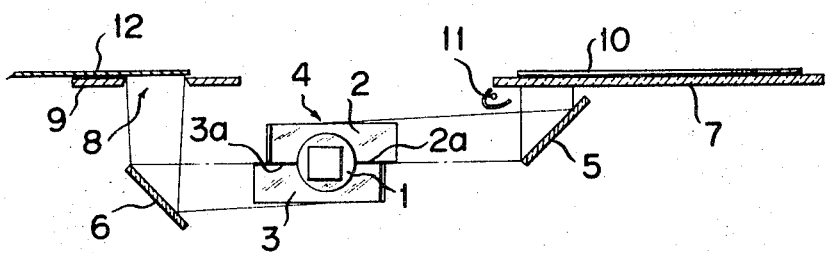
FIG. 2 is a sectional view thereof.
Figure 3:
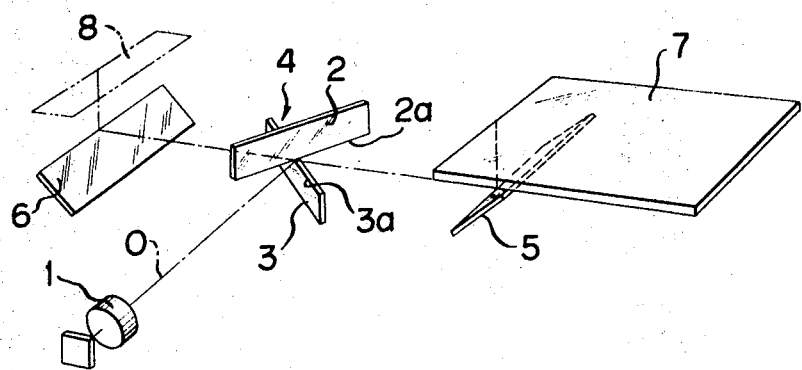
FIG. 3 is a perspective view thereof.

Referring to FIGS. 1, 2 and 3 illustrating one embodiment of the present invention, upon the optical axis O of a movable photocopying lens 1 having a reflecting mirror disposed integrally at the rear surface of the lens is disposed a movable cross-shaped reflecting mirror 4 having two reflecting surfaces 2 and 3 disposed at right angles relative to an imaginary plane containing the optical axis O (a plane parallel to the surface of the paper in FIG. 1). The side edges 2a and 3a of the reflecting surfaces 2 and 3 in contact with the imaginary plane are inclined at 45° relative to the optical axis O and their intersecting point is coincident with the optical axis O.

On the opposite sides of the cross-shaped reflecting mirror 4 are disposed a movable reflecting mirror 5 and a stationary reflecting mirror 6 respectively. The reflecting surface of the movable reflecting mirror 5 is inclined at 45° relative to the straight line passing through the above intersecting point of the cross-shaped reflecting mirror 4 in opposed relation with the reflecting surface 3 thereof. In the similar manner, the stationary reflecting mirror 6 is movably disposed at an inclined angle of 45° relative to the above straight line in opposed relation with the reflecting surface 2 of the cross-shaped reflecting mirror 4. In this case, it should be noted that the movable reflecting mirror 6 is inclined in the opposite direction relative to the stationary reflecting mirror 5 so that they are not in parallel with each other.

A transparent original holder 7 is disposed in opposed relation with the movable reflecting mirror 5 and in parallel with the above described imaginary plane. A shielding plate 9 having a slit 8 is disposed in opposed relation with the stationary reflecting mirror 6 and in parallel with the above described imaginary plane in such a manner that the slit 8 may be spaced apart from the lens 1 by an optical length equal to that between the lens 1 and the original holder 7.

Upon the surface of the original holder 7 opposite to the movable reflecting mirror 5 is placed an original 10 (See FIG. 2) with the image thereof being directed toward the mirror 5. An illumination lamp 11 is disposed in the vicinity of the original holder 7 and on the side of the reflecting mirror 5 for illuminating the original 10. The lights reflected by the original 10 are reflected by the movable reflecting mirror 5 and the reflecting surface 2 of the cross-shaped mirror 4 and made incident upon the lens 1. The lights focused and reflected by the lens 1 are reflected by the reflecting surface 3 and the stationary reflecting mirror 6 and focused upon a photocopying paper 12 through the slit 8. In this case, it must be noted that the photocopying paper 12 is moving across the slit during exposure upon the surface of the shielding plate opposite to the reflecting mirror 5 with its light-sensitized surface being directed toward the reflecting mirror 5. Since the photocopying paper 12 is moved during exposure as described above, the lens 1, the cross-shaped reflecting mirror 4 and the movable reflecting mirror 5 must be moved in unison while maintaining the similar relationship as described hereinabove except the distances therebetween in order to focus the image of the original 10 upon the moving photocopying paper 12 without any deviation and distortion. This will be described in more detail hereinafter. Both of the photocopying lens 1 and the cross-shaped reflecting mirror 4 are moved at the speed one-half that of the moving photocopying paper 12 in the direction of the movement thereof. Concurrently, the lens 1, is also moved along the optical axis O thereof at a speed one-half that of the moving photocopying paper 12. The movable reflecting mirror 5 is moved in the same direction with that of the movement of the photocopying paper 12 at the same speed with that of the paper 12.

Figure 4:
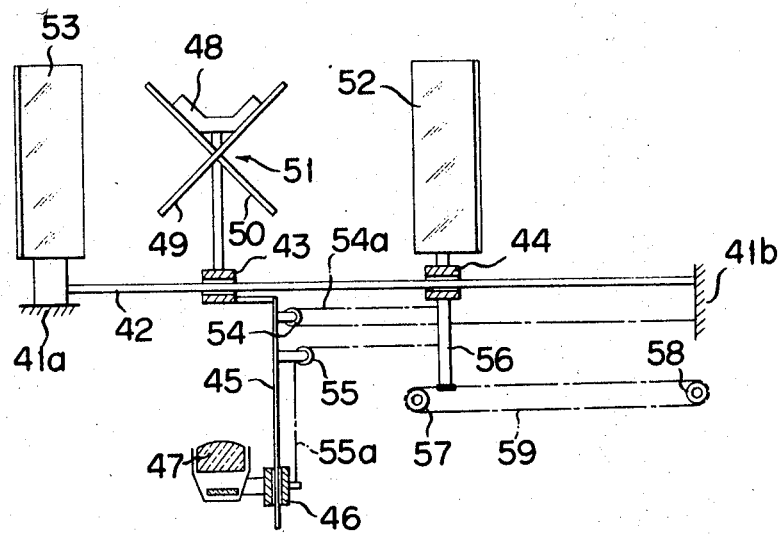
FIG. 4 is a horizontal sectional view of one embodiment of a drive mechanism for use with the above slit device.

FIG. 4 shows one embodiment of a system for driving the above movable lens and both of reflecting mirrors 4 and 5. A shaft 42 is fixedly secured at its both ends to stationary members 41a and 41b. Sliding cylinders 43 and 44 are slidably carried by this shaft 42. To the sliding cylinder 43 is fixedly secured one end of a slide rod 45 which in turn slidably carries a sliding cylinder 46. To this sliding cylinder 46 is securely fixed a photocopying lens 47 having a reflecting mirror integrally disposed at the rear surface of the lens in such a manner that the optical axis of the lens 47 may be maintained at a right angle relative to the slide shaft 42 with the front lens surface being directed upwardly. To the side of the sliding cylinder 43 opposite to the lens 47 is securely fixed a supporting member 48 which holds in stationary position a cross-shaped reflecting mirror 51 having two reflecting surfaces 49 and 50 directed toward the lens 47. As described with reference to FIGS. 1, 2 and 3, the reflecting surfaces 49 and 50 are disposed at right angles relative to an imaginary plane containing the optical axis of the lens 47 and the side edges of these surfaces 49 and 50 in contact with the imaginary plane are inclined at an angle of 45° relative to the optical axis of the lens 47. The intersecting point of these two side edges is made in coincidence with the optical axis. A stationary reflecting mirror 53 is fixedly secured to the stationary member 41a in opposed relation with the reflecting surface 50 and is inclined at 45° relative to the straight line passing through the above intersecting point and being at a right angle relative to the above imaginary plane. In the similar manner, a movable reflecting mirror 52 is securely fixed to the sliding cylinder 44 in opposed relation with the reflecting surface 49 and at 45° relative to the above-described straight line but in the direction opposite to that of the stationary reflecting mirror 53, so that the movable and stationary reflecting mirrors 52 and 53 are not in parallel with each other.

To the portions of the slide rod 45 closer to the sliding cylinder 43 are rotatably fixed pulleys 54 and 55 in spaced-apart relation. The lower end of the supporting rod 56 extending from the sliding cylinder 44 is fixed to a chain 59 lapped over sprockets 57 and 58 which are coupled to a suitable drive means so that the sliding cylinder 44 is reciprocated along the shaft 42. One ends of chains 54a and 55a extending from pulleys 54 and 55 respectively in parallel with the shaft 42 are fixed to the supporting rod 56. The other end of the chain 54a is fixed to the stationary member 41b through the pulley 54 while the other end of the chain 55a is fixed to the sliding cylinder 46 through the pulley 55.

When the chain 59 is advanced through the sprockets 57 and 58 at the same speed with that of the photocopying paper in the same direction of the movement of this paper, the movable reflecting mirror 52 is caused to move at the same speed in the same direction while the copying lens 47 and the cross-shaped reflecting mirror 51 are caused to move at a speed one-half the speed of the photocopying paper in the same direction therewith by the chain 54a. Concurrently, the lens 47 is caused to move in the direction normal to the shaft 42 at the speed one-half that of the photocopying paper by the chain 55a. It is clear that when these chains are driven in parallel with the shaft 42, the lens 47 and the cross-shaped and movable reflecting mirrors 51 and 52 are all displaced while maintaining the initial opposed relation with one another except the variation of the distances therebetween. It will be understood that means for supporting the lens and reflecting mirrors and means for driving them are not limited to the embodiment described hereinabove with reference to FIG. 4.

The slit exposure device of the present invention makes it possible to focus the image of an original held in stationary position upon a moving photocopying paper so that the present invention has many advantages over the conventional slit exposure device. For example, photocopying is very efficient and a large-sized photocopying paper advancing device is not required. According to the present invention, it is not necessary to stop the photocopying paper during its exposure, a photocopying paper-stopping and holding device and a photocopying paper-supporting stand having a wide surface area are not necessary. Furthermore, according to the present invention, the original holder may be disposed upon substantially the same plane with the slit in closely spaced-apart relation therewith and the lens and the reflecting mirrors are also disposed in the vicinity of this plane so that the slit exposure device of the present invention can be made considerable flat, and is very effective in making a photocopying machine or the like simple in construction, compact in size, light in weight and efficient in operation.

The present invention has been so far described with particular reference to the embodiment thereof, but it is to be understood that variations and modifications can be effected without departing the true spirit of the invention as described hereinabove and as defined in the appended claim.

I claim:

1. A slit exposure device comprising:
   a photocopying lens having a reflecting mirror disposed integrally at the rear surface of said lens;
   a cross-shaped reflecting mirror having two reflecting surfaces directed toward said lens at right angles relative to an imaginary plane containing the optical axis of said lens,
   side edges of said reflecting surfaces in contact with said imaginary plane being inclined at 45° to said optical axis and the intersecting point of said side edges being coincident with said optical axis,
   a stationary and movable reflecting mirror disposed on the opposite sides of said cross-shaped reflecting mirror and inclined at 45° in the opposed directions with each other relative to a straight line passing through said intersecting point and at right angle relative to said imaginary plane,
   a slit held stationarily upon a plane in parallel with said imaginary plane and in opposed relation with said stationary reflecting mirror,
   an original holder held stationarily in a plane parallel with said imaginary plane at a position spaced-apart from said lens by an optical length equal to that between said slit and said lens; and
   means for moving said lens and said cross-shaped reflecting mirror at a speed one-half that of a photocopying paper moving across and in contact with said slit in the same direction with that of said photocopying paper and concurrently moving said lens along its optical axis at a speed one-half that of said photocopying paper while moving said movable reflecting mirror at a speed equal to that of said photocopying paper in the same direction of said paper.